Nov. 19, 1940.         D. E. GOTTLIEB         2,222,409
DOG LEASH
Filed Nov. 13, 1939
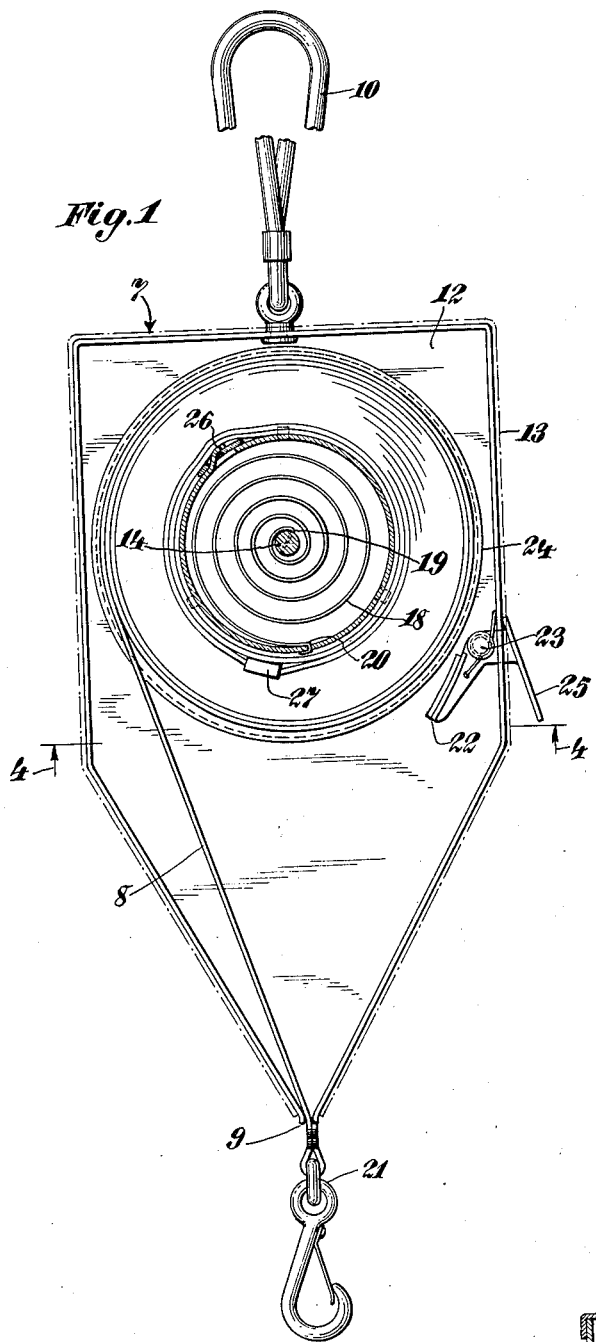
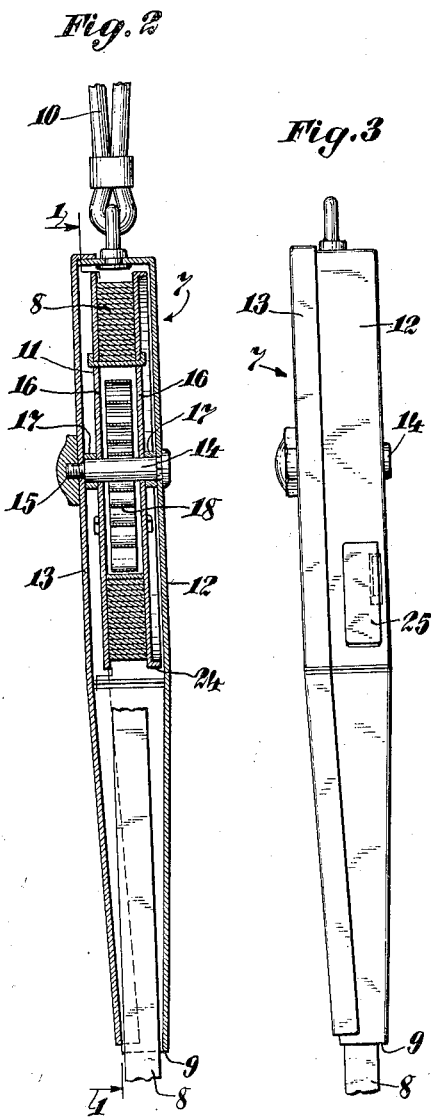
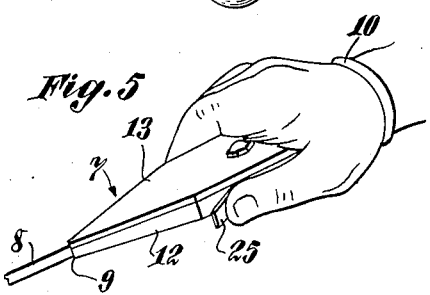
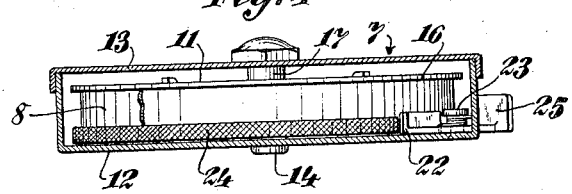
INVENTOR.
David E. Gottlieb,
BY
Philip S. McLean
ATTORNEY.

Patented Nov. 19, 1940

2,222,409

UNITED STATES PATENT OFFICE 2,222,409

DOG LEASH

David E. Gottlieb, New York, N. Y.

Application November 13, 1939, Serial No. 304,083

2 Claims. (Cl. 242—98)

The invention herein disclosed relates to dog leashes.

Special objects of the invention are to provide an animal leash, which will automatically pay out or take in according to the movements of the animal, which will be in a form that can be conveniently carried in the hand, which will enable desirable guiding and control effects to be exercised over the animal and which will be entirely practical and inexpensive in construction.

The foregoing and other desirable objects are attained by novel features of construction, combinations and relations of parts all as hereinafter described, illustrated in the accompanying drawing and broadly covered in the claims.

The drawing illustrates one of the practical embodiments of the invention. The structure however may be modified and changed as regards this illustration, all within the true intent of the invention, as will be clear from the scope of the claims.

Fig. 1 is a broken part sectional view as on substantially the plane of line 1—1 of Fig. 2, showing the leash strap wound on the spring drum within the hand casing.

Fig. 2 is a broken longitudinal sectional view as on substantially the plane of the vertical center line of Fig. 1.

Fig. 3 is a broken side elevation of the device.

Fig. 4 is a broken cross-sectional detail on substantially the plane of line 4—4 of Fig. 1.

Fig. 5 is a broken perspective showing how the device is carried in the hand and operated to exercise the desired control.

As shown in Fig. 5, the device consists in the main of a small flat casing 7, of a size and shape to be readily grasped in the palm of the hand and from which the leash strap 8, issues through a guide nozzle 9. A loop 10, is shown connected with the top or opposite end of the case which may be engaged about the wrist and which may take most of the pull and serve also as a means for preventing the device from being jerked out of the hand.

Within the casing is journalled a spring wound drum or reel 11, for the strap.

The details of construction may vary but in Figs. 1 and 2, the casing is shown as made up of telescopically engaging back and front sections 12, 13, held together by a stud 14, secured non-rotatably to the back section and receiving a nut 15, at the opposite end clamping the front cover section in place. The reel is shown as made up of spaced side plates 16, having hub portions 17, rotatably engaged on the stud. Between the side plates is shown a spiral spring 18, anchored to the stud at its inner end at 19, Fig. 1, and connected at its outer end at 20, to the peripheral portion of the reel.

The leash strap is shown in the form of a flat tape. This is a desirable construction because of the fact that a relatively long length will wind in small space. Other forms however may be used. Similarly, while the strap is shown equipped with a snap hook 21, it will be appreciated that other means may be provided for enabling quick connection of the leash to the collar of the animal.

The guide nozzle 9, is shown projected or spaced an appreciable distance from the center of the reel, thus to enable said guide being used as a means for directing and restraining an animal on the leash.

Further restraint is provided for, in the illustration, by means of a brake 22, pivoted in the casing at 23, and positioned to engage a brake flange 24, on the rim of the reel, which for frictional purposes may be roughened as indicated in Fig. 4, said brake having an external thumb lever 25, by which the same may be readily actuated to any desired extent by the thumb of the hand in which the device is gripped.

By applying the brake, the animal may be restrained or stopped. By holding pressure on the brake lever, the leash may be maintained at any desired length. With the brake off, the leash strap is free to wind in and out with movements of the animal one way or another.

To prevent undue strain on the spring or the strap possibly pulling away from its point of attachment at 26, to the reel, there is provided in the illustration, a stop 27, on the strap near its inner end which is of too large a size to pass out through the guide opening 9. This provides a limit to which the strap can be withdrawn from the case.

The finger actuated brake provides a convenient means for controlling the strap and since, in the form shown this brake engages the flange of the reel, such control is exercised without occasioning any wear on the strap.

The hand casing may be made of metal, plastic, leather or other materials, and may be finished in various decorative ways. In one method of manufacture, the casing is made up in light sheet metal and provided with leather or fabric covers to suit or to match different dress ensembles.

What is claimed is:

1. A dog leash, comprising a hand casing having a strap guide in one end and provided with a wrist loop at the opposite end of the same, a spring wound reel in said hand casing and a leash strap connected with said reel and issuing through said guide in the end of said hand casing, means on the end of said strap external of said casing for connection with a dog collar and a stop fixed on said strap inside the casing and engageable with said strap guide for limiting the extent of movement of said leash strap through said guide.

2. A dog leash, comprising a hand casing of a size and shape to be held in the palm of the hand, a loop of flexible material connected with one end of said hand casing and of an extent to be freely engageable about the wrist of the hand in which the casing is held and the flexibility of said loop being sufficient to permit free movement of the hand while the casing is suspended from the wrist by said loop, said hand casing having a guide opening at the opposite end, a spring wound reel journalled in said casing, a leash strap connected with said reel and issuing through said guide opening, said leash strap having means at the end of the same outside said casing for detachable connection with a dog collar and means for controlling said spring reel and including a finger operable controller on the outside of said casing in position for operation by a finger of the hand when said casing is held positioned by said wrist loop in the palm of the hand.

DAVID E. GOTTLIEB.